3,147,216
SEPARATION OF HYDROCARBON/WATER
MIXTURES
Alan Norton Oemler, Wilmington, Del., assignor to E. I. du Pont de Nemours and Company, Wilmington, Del., a corporation of Delaware
No Drawing. Filed Sept. 28, 1961, Ser. No. 141,302
4 Claims. (Cl. 210—40)

The present invention relates to the separation of liquid hydrocarbons from mixtures thereof in aqueous systems, and, more particularly, relates to the purification of aqueous systems by removal of liquid hydrocarbon traces.

In accordance with the present invention, it was discovered that the fluff of a crystalline solid polyolefin is capable of adsorbing more than its weight of liquid hydrocarbon and hydrocarbon-like materials.

Crystalline polyolefin fluff is defined as finely divided, porous, crystalline polyolefin having a particle size of from 0–20% retained on a #20 mesh to 5–10% passing through #60 mesh. Polyolefin fluff differs from normally finely divided polyolefin powders in that it contains an extremely large number of capillary channels, whereas the normally finely divided polyolefin powder comprises solid particles.

Polyolefin fluff is obtained by several methods. One method comprises preparing a solution of the polyolefin in a volatile hydrocarbon solvent and then flashing off the solvent at temperatures at which the polyolefin solidifies. Another method comprises cooling a solution of the polyolefin in a hydrocarbon solvent to a temperature at which the polymer precipitates in the form of a gel and then flashing off the solvent. Other methods will occur to those skilled in the art.

The extraordinary ability of polyolefin fluff to adsorb hydrocarbon liquids is explained by a combination of the chemical hydrocarbon structure of the polyolefin and the physical structure of the fluff. The use of the fluff in the separation of hydrocarbon liquids from aqueous systems is made simple by the fact that both the hydrocarbon liquid and the fluff have a density below that of water. An additional benefit derived from the use of the polyolefin fluff is its chemical inertness to almost all inorganic compounds and many organic compounds. Little or no polar compounds are adsorbed by the polyolefin fluff; the adsorbtivity of the polyolefin being extremely selective and substantially limited to hydrocarbon and hydrocarbon-like compounds immiscible with water.

The polyolefins which are preferably used in the process of the present invention are crystalline polymers of olefins having the general formula $RCH=CH_2$ where R is selected from the group consisting of hydrogen and alkyl radicals having up to 8 carbon atoms. However, the specific chemical structure of the polyolefin employed is not critical, if it meets the physical requirements of a fluff set forth above. The molecular weight of the polyolefin is not critical and any crystalline polyolefin, solid at the temperatures at which it is to be employed, is suitable.

The hydrocarbons separated from an aqueous phase by the process of the present invention comprise all liquid water-immiscible hydrocarbons and all those compounds which are essentially hydrocarbon in nature, i.e., are immiscible in water and contain hydrocarbon radicals of at least three carbon atoms. Specific examples of hydrocarbons and hydrocarbon-like substances include gasolines, kerosenes, light oils, heavy oils, aromatic solvents, e.g., benzene, toluene and xylene, terpenes and water-immiscible ketones, esters, aldehydes, amides, amines, mercaptans, fatty acids, fatty acid esters and halohydrocarbons.

Various methods of carrying out the process of the present invention will be apparent. In one embodiment, the process is carried out by passing the stream containing the hydrocarbon through an agitated vessel to which the polyolefin fluff is added and which has sufficient hold-up time to allow the polyolefin to adsorb the hydrocarbon and form agglomerates. The stream is then passed over a weir which separates the agglomerates of the hydrocarbon and the polyolefin fluff from the aqueous phase. If it is desired to recover the hydrocarbon from the fluff, this can be readily accomplished by compressing the fluff and physically forcing the adsorbed hydrocarbon out. The quantity of fluff required for any particular hydrocarbon or hydrocarbon concentration in the aqueous system is readily determined by small scale experiments in which increasing quantities of fluff are added with agitation to a sample of the system to be separated until the desired degree of agglomeration has been achieved.

The invention is further illustrated by the following examples.

*Example I*

Water was circulated upward through a ½″ diameter glass tube containing 3 g. of a polyethylene fluff having a particle size of 20–60 mesh. Colored hydrocarbon oil (heat exchange white mineral oil, "Primol D") was injected into the bottom of the tube until the colored oil commenced to escape from the top of the polyethylene fluff bed. The fluff bed retained oil equivalent to 107% by weight of fluff.

*Example II*

Between two vertical screens on a surface of water was placed 1 g. of polyethylene fluff described in Example I. Hydrocarbon oil (heat exchange white mineral oil, "Primol D") was dripped on the water which was passed through the screens. The fluff retained oil equivalent to 150% by weight of fluff.

*Example III*

Following the procedure of Example I, but using cyclohexane instead of the hydrocarbon oil, the fluff was found to retain cyclohexane equivalent to 62% by weight of fluff.

*Example IV*

Following the procedure of Example I, but using limonene instead of cyclohexane, the fluff was found to retain limonene equivalent to 102% by weight of fluff.

*Example V*

Following the procedure of Example I, but using xylene instead of the hydrocarbon oil, the fluff was found to retain xylene equivalent to 78% by weight of fluff.

*Example VI*

Following the procedure of Example I, but using oleic acid instead of the hydrocarbon oil, the fluff was found to retain oleic acid equivalent to more than 100% by weight of the fluff.

*Example VII*

Following the procedure of Example I, but using crystalline polypropylene fluff instead of the polyethylene fluff, polypropylene fluff was found to retain hydrocarbon oil equivalent to 230% by weight of the fluff.

The following materials were found to retain little or no hydrocarbon oil under the conditions of Example I: expanded polystyrene particles, commercially available as "Pelaspan"; diatomaceous earth, commercially available as "Celite"; and ground polyethylene having particles in the same size range as the polyethylene fluff used in the examples but prepared from extruded polyethylene.

I claim:
1. Method of separating liquid hydrocarbons and liquid compounds immiscible in water and containing hydrocarbon radicals of at least 3 carbon atoms from aqueous mixtures thereof which comprises contacting said mixture with a polyolefin fluff, said polyolefin being a normally solid crystalline polymer of an olefin having the general formula $RCH=CH_2$ where R is selected from the group consisting of hydrogen and alkyl radicals, said fluff having a particle size of about 20 to 60 mesh and thereafter separating the polyolefin fluff containing said liquid hydrocarbon from said aqueous phase.

2. The method set forth in claim 1 wherein the mixture separated comprises an aqueous phase and a liquid hydrocarbon phase.

3. The method set forth in claim 1 wherein the polyolefin fluff is polyethylene fluff.

4. The method set forth in claim 1 wherein the polyolefin fluff is polypropylene fluff.

References Cited in the file of this patent
UNITED STATES PATENTS

| | | |
|---|---|---|
| 2,953,502 | Binning et al. | Sept. 20, 1960 |
| 2,965,445 | Goens et al. | Dec. 20, 1960 |
| 3,019,904 | Stecher | Feb. 6, 1962 |